(12) United States Patent
Russhard et al.

(10) Patent No.: US 10,281,297 B2
(45) Date of Patent: May 7, 2019

(54) BLADE TIP TIMING

(71) Applicant: ROLLS-ROYCE PLC, London (GB)

(72) Inventors: Peter Russhard, Nottingham (GB); Jason David Back, Derby (GB)

(73) Assignee: ROLLS-ROYCE plc, London (GB)

( * ) Notice: Subject to any disclaimer, the term of this patent is extended or adjusted under 35 U.S.C. 154(b) by 1061 days.

(21) Appl. No.: 14/204,210

(22) Filed: Mar. 11, 2014

(65) Prior Publication Data

US 2014/0288865 A1 Sep. 25, 2014

(30) Foreign Application Priority Data

Mar. 21, 2013 (GB) .................................. 1305199.0

(51) Int. Cl.
*G01D 3/02* (2006.01)
*G01H 1/00* (2006.01)
*F01D 17/02* (2006.01)
*F01D 21/00* (2006.01)
*G01M 15/14* (2006.01)

(52) U.S. Cl.
CPC .............. *G01D 3/02* (2013.01); *F01D 17/02* (2013.01); *F01D 21/003* (2013.01); *G01H 1/006* (2013.01); *G01M 15/14* (2013.01); *F05D 2270/821* (2013.01)

(58) Field of Classification Search
CPC .......... G01H 1/006; G01D 3/02; F01D 17/02; F01D 21/003; G01M 15/14; F05D 2270/821
USPC ................................... 702/179, 56
See application file for complete search history.

(56) References Cited

U.S. PATENT DOCUMENTS

| | | | | |
|---|---|---|---|---|
| 8,457,909 B2 * | 6/2013 | Russhard | ............... | G01H 1/006 702/179 |
| 2009/0319206 A1 * | 12/2009 | Russhard | ............... | G01H 1/006 702/56 |
| 2010/0153031 A1 * | 6/2010 | Russhard | ............... | G01H 1/006 702/56 |

(Continued)

FOREIGN PATENT DOCUMENTS

| | | |
|---|---|---|
| EP | 2 136 189 A2 | 12/2009 |
| EP | 2199764 A2 | 6/2010 |

(Continued)

OTHER PUBLICATIONS

Sep. 14, 2015 European Search Report issued in European Patent Application No. EP 14 15 8714.

(Continued)

*Primary Examiner* — Regis J Betsch
*Assistant Examiner* — Kaleria Knox
(74) *Attorney, Agent, or Firm* — Oliff PLC

(57) ABSTRACT

A method of zeroing displacement data derived from a rotor having an array of features monitored by an array of stationary timing probes. The method includes steps to calculate the displacement at each probe for each of at least two measured revolutions from time of arrival measurements. Each displacement is defined as a sum of a common term and a unique term. The set of displacements is solved for the common term and the unique terms. A probe offset is calculated from each unique term. The zeroed displacements are determined by subtracting the common term and probe offset from the calculated displacements for each probe.

18 Claims, 4 Drawing Sheets

(56) References Cited

U.S. PATENT DOCUMENTS

2010/0161245 A1   6/2010   Rai et al.
2011/0010108 A1   1/2011   Bhattacharya et al.

FOREIGN PATENT DOCUMENTS

| EP | 2 532 839 A2 | 12/2012 |
|----|--------------|---------|
| GB | 2466817 A | 7/2010 |
| GB | 2491632 A | 12/2012 |

OTHER PUBLICATIONS

British Search Report issued in British Patent Application No. GB1305199.0 dated Sep. 4, 2013.

\* cited by examiner

BLADE TIP TIMING

The present invention relates to zeroing displacement data to enable vibration events to be identified and analysed. It finds particular, but not exclusive, utility in zeroing blade tip displacement data derived from a gas turbine engine rotor.

Blade tip displacement data is analysed to identify vibration events. It is known to be beneficial to zero the data in order to remove unwanted noise and steady-state offset components from the data before identifying vibration events and characterising them. Previous methods include manual review by skilled engineers who conduct visual inspection for vibration events and isolate them from the remainder of the data. Then a data averaging technique is applied to the remainder of the data and a manual average added across the vibration event.

One disadvantage of this method is that it requires significant time from skilled vibration engineers to identify and isolate the vibration events in the data.

A further conventional method comprises automatically detecting and isolating vibration events, for example as described in EP 2,136,189 and in EP 2,199,764.

A disadvantage of both these methods is that modern blade tip displacement probes are able to detect very small displacements, the magnitude of which is similar to the magnitude of the noise in the signal. Therefore, it is difficult for even skilled engineers to correctly identify and isolate all the vibration events in the data. Another disadvantage is that mischaracterising the boundaries of the vibration event, when isolating the event in the data, causes some of the vibration data to be included in the averages for the portions of the data between the vibration events which consequently skews the averages. Using this average in subsequent analysis of the vibration data will add uncertainty to reported displacement amplitude. In some cases, the uncertainty will be so large as to cause the amplitudes to be unusable.

The present invention provides a method of zeroing displacement data that seeks to address the aforementioned problems.

Accordingly the present invention provides a method of zeroing displacement data, wherein the data is derived from a rotor having an array of features that rotate at a rotational speed, the features monitored by an array of stationary timing probes; the method comprising steps for each feature to:
a) measure actual time of arrive of the feature at each probe for at least two consecutive revolutions of the rotor;
b) subtract a predicted time of arrival of the feature at each probe to give a difference;
c) multiply the difference by the rotational speed to calculate the displacement at each probe for each measured revolution;
d) define each displacement as a sum of a common term and a unique term, wherein the common term is common to all the calculated displacements and the unique term is dependent on the probe;
e) solve the set of displacements for the common term and the unique terms;
f) calculate a probe offset from each unique term; and
g) determine the zeroed displacements by subtracting the common term and probe offset from the calculated displacements for each probe.

Advantageously, the method of the present invention enables displacement data to be zeroed without first identifying and isolating vibration events. It also enables small displacements to be detected, the magnitude of which is similar to the magnitude of noise in the signal. The method can be automated to fully analyse displacement data without requiring input from skilled engineers.

The method may be repeated for each feature comprised in the array. The method may be performed in parallel for at least two of the features comprised in the array. Advantageously this enables the method to be performed substantially in real time. The method may, therefore, be used for real time monitoring of the rotor from which the displacement data is derived.

The method may comprise a step before step g) to calculate a common offset from the common term. Advantageously calculation of the offsets enables the method to separate dynamic and steady-state content from the common and unique terms. Where a common offset has been calculated, the step g) may comprise subtracting only the common offset element of the common term. Advantageously this removes the steady-state offset but leaves the dynamic content in the zeroed displacements.

The step of calculating the common offset may comprise fitting a curve to the common term. The step of calculating the probe offset may comprise fitting a curve to each unique term. The curve fitting may comprise expressing the term relative to speed instead of as a time history. The curve fitting may comprise applying a linear fit. Preferably the linear fit may be a piecewise linear fit. Advantageously, a piecewise linear fit is appropriate for the probe offsets which are generally dependent on acquisition system errors which vary proportionately with rotational speed. Alternatively the curve fitting may comprise fitting a different shape curve such as quadratic, polynomial, sinusoidal or logarithmic. Advantageously, a quadratic fit may be appropriate for the common offsets which may be dependent on blade untwist, for a bladed rotor, which varies proportionately with the square of rotational speed.

The method may comprise a further step between steps d) and e) to write the displacements as a matrix. Advantageously, a matrix is an efficient way to condense the set of displacements expressed as the sum of a common term and a unique term. Step e) may comprise applying Gaussian elimination and back substitution.

The method may comprise a further step between steps d) and e) to apply a filter to the unique terms. The filter may comprise one of the group comprising: a low pass filter; a band pass filter; and a fixed length Savitsky Golay filter. Advantageously this reduces or removes dynamic content before the step of solving the set of displacements.

The method may comprise a further step to determine vibration amplitude and phase from the zeroed displacements. Advantageously the amplitudes and phases will have less uncertainty than in known methods. Furthermore smaller amplitudes can be determined from the zeroed displacements obtained from the method according to the present invention.

The method may comprise a further step to calculate the gradient of each unique term with respect to speed to determine measurement system quality. Advantageously, the gradient indicates the level of acquisition system errors with respect to speed. This enables the acquisition system to be compared with other systems or for performance of the system to be tracked over time. The method may also comprise a step of determining the magnitude of the unique term at zero speed to determine the position error of the probe.

The present invention also provides a computer program having instructions adapted to carry out the method described; a computer readable medium, having a computer program recorded thereon, wherein the computer program is adapted to make the computer execute the method described; and a computer program comprising the computer readable medium.

The present invention also comprises a displacement system comprising: a rotor having an array of features that rotate at a rotational speed; an array of stationary timing probes arranged to measure the time at which each feature passes the probe for each of at least two revolutions of the rotor; and a processor configured to perform the method as described. Preferably all the parts of the displacement system may be commonly located, for example in a gas turbine engine. Advantageously, the method may then be performed in real time. Alternatively the processor may be located remotely to the rotor and probes. Advantageously, the method may then be performed for offline analysis of the displacement data.

The probes may be unequally circumferentially spaced. Advantageously, unequally spaced probes can detect more than one vibration mode of the rotor.

Each feature may comprise a blade of a bladed rotor. In particular, each feature may comprise the tip of a blade or a feature on the tip of a blade.

The present invention also provides a gas turbine engine comprising the displacement system described. The rotor may comprise one of the group comprising: a compressor rotor; a fan; and a turbine rotor.

Any combination of the optional features is encompassed within the scope of the invention except where mutually exclusive.

The present invention will be more fully described by way of example with reference to the accompanying drawings, in which.

Figure 1:
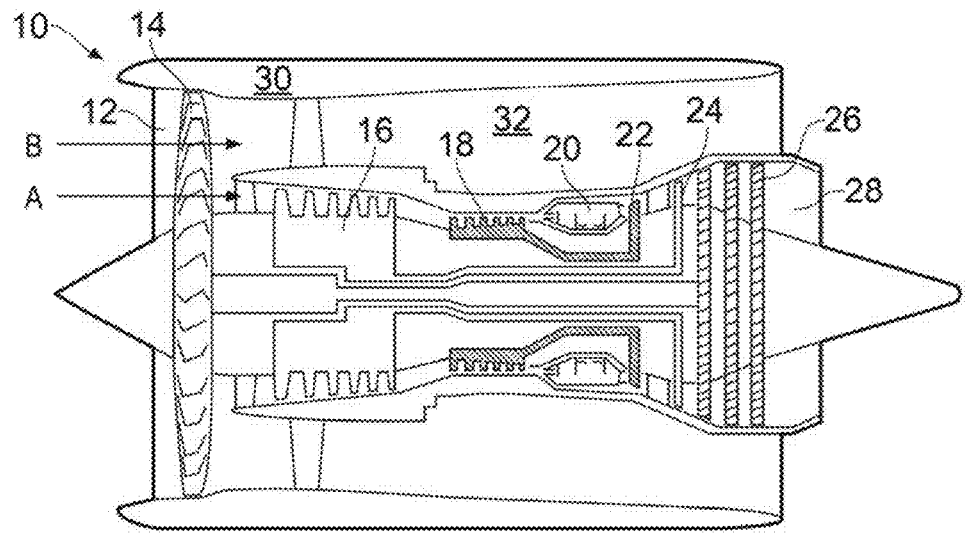
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Figure 2:
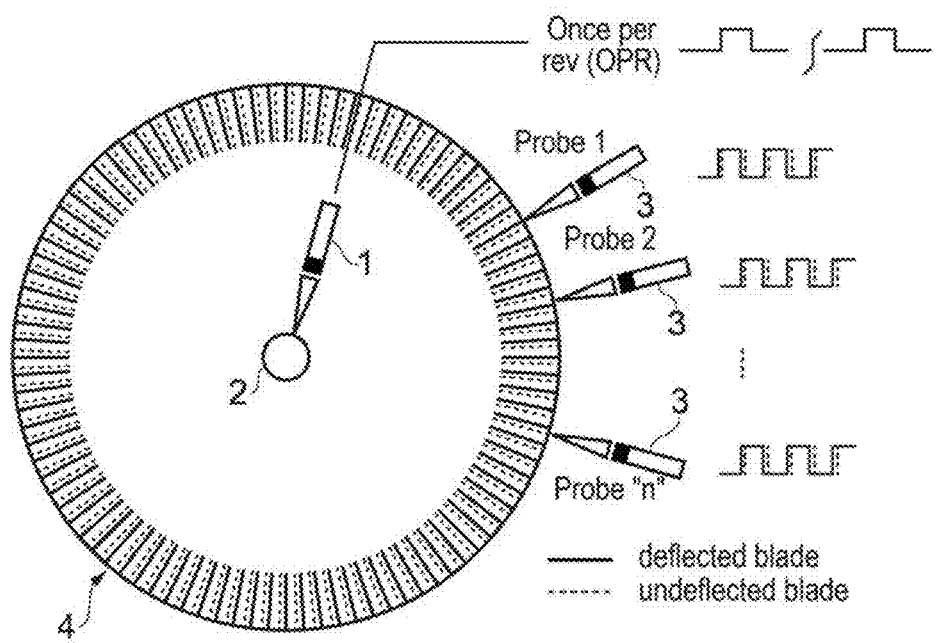
FIG. 2 is a schematic drawing of a blade tip timing arrangement.

FIG. 2 shows schematically a blade tip timing (BTT) arrangement. A once per revolution probe 1 monitors the angular position of the rotor 2. BTT probes 3 are mounted to a casing (not shown) and provide time of arrival measurements of the blades 4 mounted to the rotor 2. For example, the rotor 2 and blades 4 arrangement may be the fan 14, one of the stages of the intermediate pressure or high pressure compressor 16, 18 or one of the stages of the low pressure, intermediate pressure or high pressure turbine 22, 24, 26.

In an embodiment of the present invention there are nine BTT probes 3 provided which are spaced around at least some of the circumference of the casing. Alternatively there may be a different number of probes 3. Preferably the probes 3 are irregularly spaced so that vibrations at different excitation frequencies are captured. An example set of probes may be located at 353.2°, 326.6°, 319.1°, 295.7°, 285.7°, 271.9°, 264.5°, 237.4° and 207.3°, each measured from top dead centre of the engine 10. Alternatively the probes 3 may be equally spaced circumferentially about the whole of the casing or a segment thereof.

In a first step of the method of the present invention the time of arrival of each of the blades 4 at each probe 3 is measured for at least two revolutions of the rotor 2. The predicted time of arrival of each blade 4 at each probe 3 may be calculated from the rotational speed of the blade tip and the position of the probe 3. Due to vibration experienced by the rotor 2 and/or the blades 4, the measured time of arrival will differ from the predicted time of arrival by a time difference. The vibration comprises a component that is synchronous, that is it comprises a frequency that is an integer multiple of the rotor speed, and a component that is asynchronous, that is it comprises a frequency that is a non-integer multiple of the rotor speed. Synchronous vibration may be caused by mechanical excitation, whereas asynchronous vibration is caused by non-mechanical excitation such as acoustic noise, rotating stall or blade flutter.

In a second step of the method the predicted time of arrival of the blade tip at the probe 3 is subtracted from the measured time of arrival to give a difference. In a third step of the method this difference is multiplied by the rotational speed of the rotor 2, in radians/second, and the radial length of the blade 4 to give the calculated blade tip displacement $d_j$ at the jth probe 3. These steps are repeated for the second revolution of the rotor 2. At the conclusion of the first, second and third steps of the method a set of calculated displacements $d_{jm}$ is available, where the subscript j represents the number of the probe 3 and the subscript m represents the revolution of the rotor 2. Hence the displacement calculated from the arrival time at the third probe 3 on the second revolution of the rotor 2 is represented as $d_{32}$.

Blade tip displacement $d_j$ for a given revolution can be described by $$d_j = P_j + (a_0 + a_1 \sin EO\theta_j + a_2 \cos EO\theta_j) + (b_1 \sin feo\theta_j + b_2 \cos feo\theta_j) + noise,$$

where $P_j$ is the positional offset of the jth probe 3 which comprises offsets that are unique to the jth probe 3 and an offset that is common to all the probes 3, $\theta_j$ is the angular position of the jth probe 3 measured from top dead centre of the rotor 2, EO is the engine order calculated as the product of response frequency and revolution period, and feo is the fractional engine order. Thus $(a_0 + a_1 \sin EO\theta_j + a_2 \cos EO\theta_j)$ describes the synchronous vibration component and $(b_1 \sin feo\theta_j + b_2 \cos feo\theta_j)$ describes the asynchronous vibration component. There are five constants from which blade displacement amplitude, phase and steady state position can be determined, three for the synchronous vibration component ($a_0$, $a_1$ and $a_2$) and two for the non-synchronous vibration component ($b_1$ and $b_2$). Noise is a term relating to measurement uncertainty.

The displacement $d_j$ can be defined as the sum of two terms in a fourth step of the method. The first is a common term $P_{common}$ which is common to the displacements measured at all the probes 3 for a single blade 4. Although it changes over time, it has a slow rate of change and therefore an average taken over two revolutions is a good approximation of $P_{common}$ for either of those revolutions. The term $P_{common}$ encompasses factors including the blade's circumferential position relative to a once per revolution indicator, blade lean, blade untwist and measurement system errors related to differential untwist between the blades and the shaft about which they rotate.

The second term is a unique term $P_{j\_unique}$ which is dependent on the probe 3. The term $P_{j\_unique}$ encompasses factors including the tolerance of the probe position, errors in the data acquisition, and also the sine, cosine and noise terms. Optionally a filter can be applied to the unique term $P_{j\_unique}$ to reduce the dynamic content of the term. The application of a filter also improves the fidelity of the probe offset value that is to be determined. For example, a fixed length Savitsky Golay filter may be used having sixteen values. Alternatively a low pass filter, a band pass filter or another smoothing filter applying polynomial regression may be used.

Thus the calculated blade tip displacements $d_j$ can be written as $d_j = P_{common} + P_{j\_unique}$. An exemplary set of blade tip displacements $d_j$ are measured at three probes 3. Preferably the set of blade tip displacements $d_j$ for two revolutions of the rotor 2 can be written in matrix form thus:

$$\begin{bmatrix} 1 & 1 & 0 & 0 & 0 & 0 \\ 1 & 0 & 1 & 0 & 0 & 0 \\ 1 & 0 & 0 & 1 & 0 & 0 \\ 1 & 0 & 0 & 0 & 0 & 0 \\ 1 & 0 & 0 & 0 & 0 & 0 \\ 1 & 0 & 0 & 0 & 0 & 0 \end{bmatrix} \begin{bmatrix} P_{common} \\ P_{1\_unique} \\ P_{2\_unique} \\ P_{3\_unique} \\ 0 \\ 0 \end{bmatrix} = \begin{bmatrix} d_{11} \\ d_{21} \\ d_{31} \\ d_{12} \\ d_{22} \\ d_{32} \end{bmatrix}.$$

The multiplication matrix has j×m rows and j×m columns, where m is the number of revolutions measured. The multiplication matrix comprises ones in the first column for every row. The first j rows comprise an identity matrix (that is, having ones on the diagonal and zeroes in all other positions) described from the second column, padded with zeroes in the remaining columns. The subsequent rows comprise zeroes in all the columns except the first.

Where more than two revolutions of the rotor 2 are used, the multiplication matrix comprises additional rows each having a one in the first column and zeroes in the other columns.

A fifth step of the method of the present invention comprises solving the set of displacements $d_j$ for the common term $P_{common}$ and the unique terms $P_{j\_unique}$. For example, where the set of displacements $d_j$ have been written in matrix form they can be solved using Gaussian elimination and back substitution. Advantageously, using the calculated displacements for two consecutive revolutions of the rotor 2 generates more equations (matrix rows) than there are unknowns so that a unique solution can be found for each of the unique terms and the common term.

Figure 3:
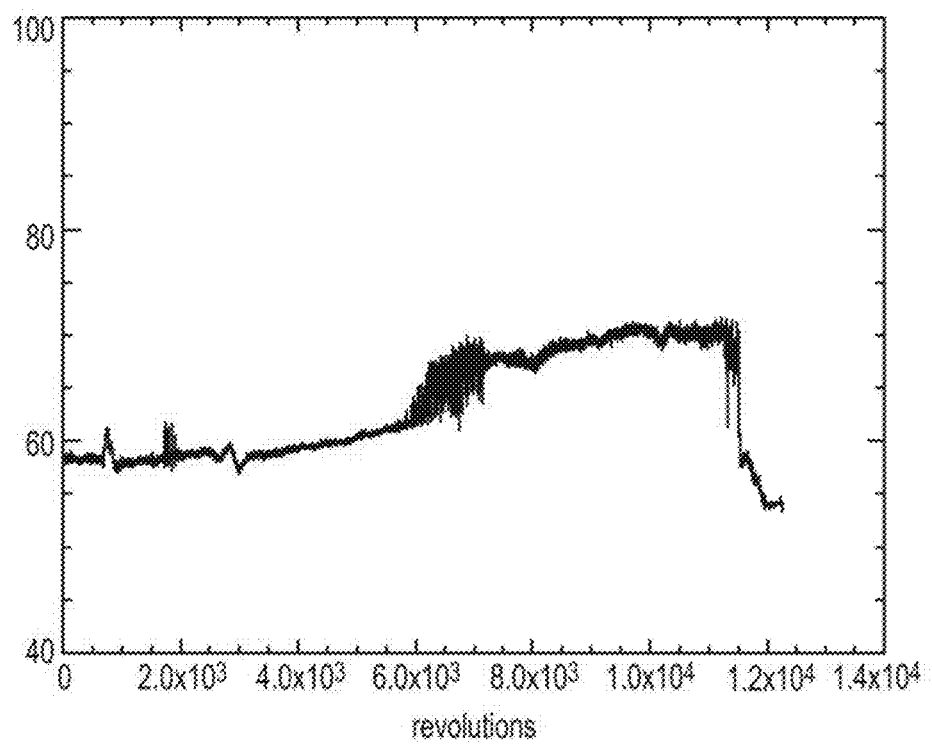
FIG. 3 is a graph showing calculated blade tip displacement data for an exemplary data set.
Figure 4:
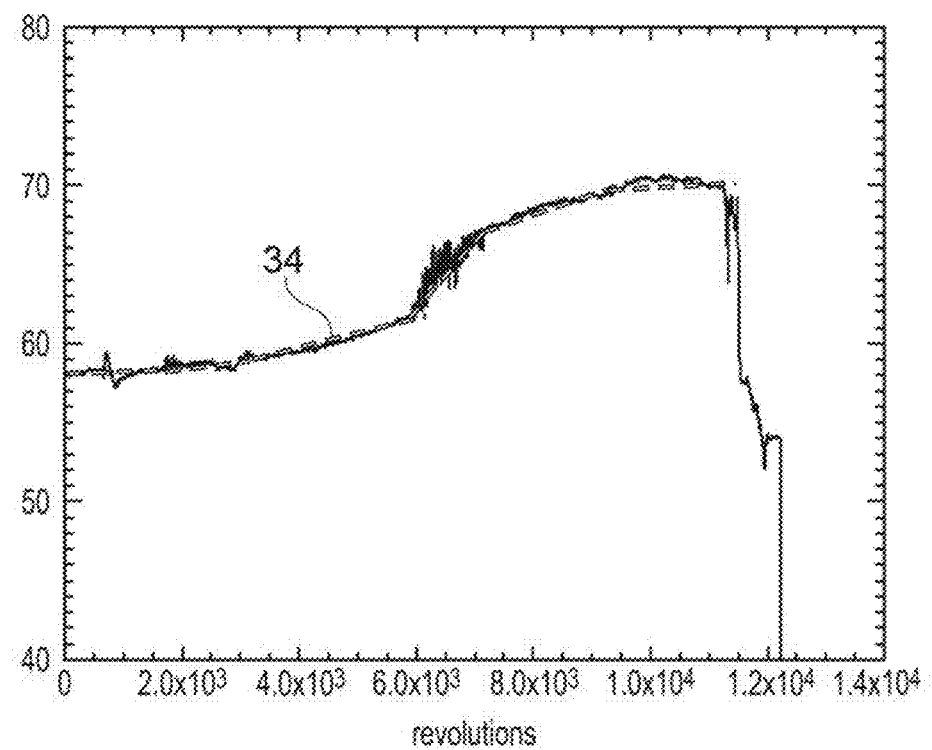
FIG. 4 is a graph showing $P_{common}$ and $P_{c\_offset}$ for the exemplary data set.

FIG. 3 illustrates the calculated blade tip displacements $d_j$ from time of arrival data collected at a single exemplary probe 3 and plotted as a time history against rotor revolutions. FIG. 4 illustrates $P_{common}$ calculated from the exemplary data set plotted as a time history. By comparing the two figures it can be seen that the underlying shape is similar because that is governed by the factors encompassed by $P_{common}$. $P_{common}$ contains some dynamic content, for example due to vibration of the casing to which the probes 3 are attached and which therefore affects all the probes 3 in common. This can be removed from $P_{common}$ by fitting a curve 34 to the data which represents the common offset $P_{c\_offset}$. In order to fit the curve 34 the common term $P_{common}$ (y-axis) is replotted against speed (x-axis), rather than as a time history. In a preferred embodiment the curve 34 is fitted using a piecewise linear fit algorithm, that is straight lines are fitted to consecutive portions of the data, the straight lines being contiguous with adjacent straight lines but having different gradients. Alternatively, however, the curve 34 that is fitted may be a straight line through all the data, a quadratic, higher order polynomial, sinusoidal or logarithmic curve. For example, it may be advantageous in some applications to fit a quadratic curve 34 to the $P_{common}$ data to account for blade untwist which is proportional to the square of the rotational speed. The curve 34 may be fitted graphically or mathematically and can then be shown on the time history as illustrated in FIG. 4. An advantage of using a piecewise linear fit to generate curve 34 representing common offset $P_{c\_offset}$ is that it acts to filter the blade tip displacements $d_j$. Alternatively, the resulting displacement can be filtered using a low pass filter and applying a phase shift thereto.

Figure 5:
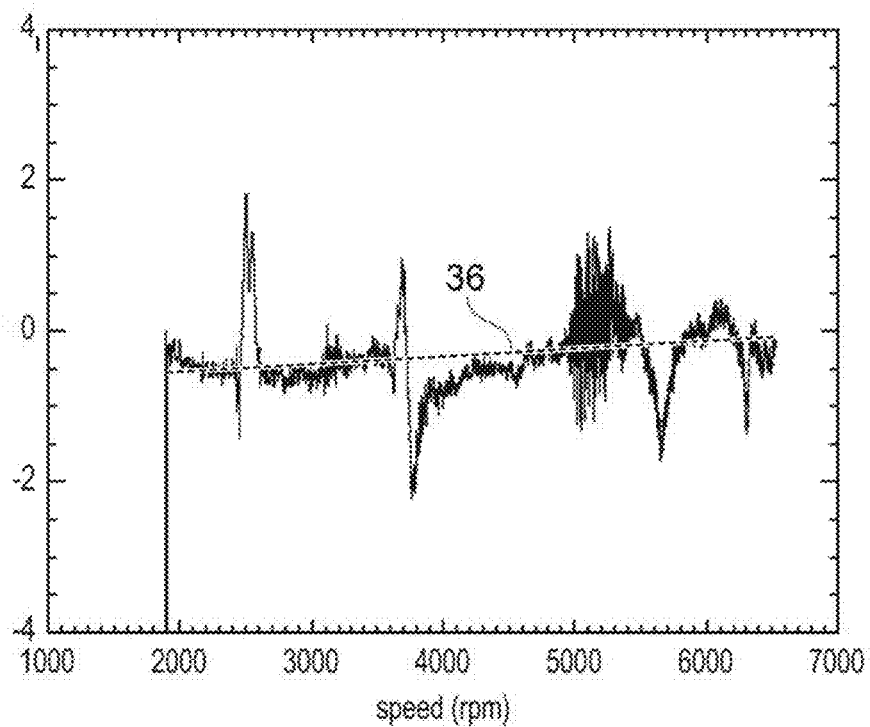
FIG. 5 is a graph showing $P_{j\_unique}$ and $P_{j\_offset}$ for the exemplary data set.

FIG. 5 illustrates the remainder when $P_{common}$ is subtracted from the calculated blade tip displacements $d_j$ and plotted against speed. Thus FIG. 5 can be considered as FIG. 3 minus FIG. 4, and replotted against speed instead of as a time history. A curve 36 can then be fitted to the data illustrated in FIG. 5. As illustrated this is a straight line, which is advantageous because acquisition system errors are generally proportional to rotational speed. However, in other embodiments or applications a different type of curve 36 may be fitted such as a quadratic, higher order polynomial, sinusoidal or logarithmic curve. The curve 36 may be fitted graphically or mathematically. The curve 36 represents the probe offset $P_{j\_offset}$ to be compensated in order to zero the blade tip displacement data at each speed.

Figure 6:
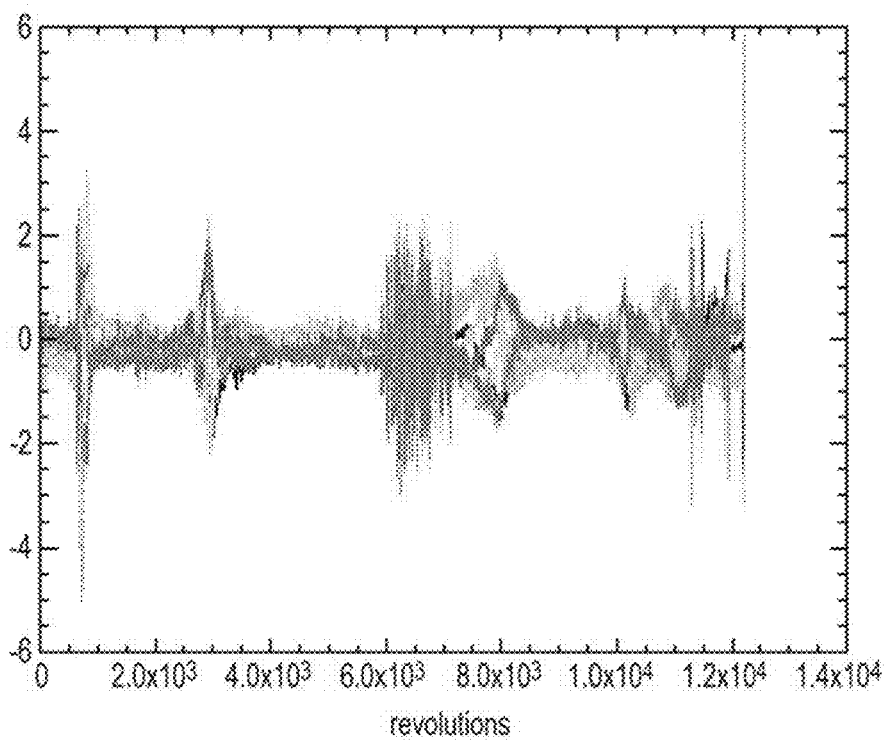
FIG. 6 is a graph showing zeroed blade tip displacements for the exemplary data set.

In a final step of the method, the zeroed blade tip displacements $\bar{d}_j$ are determined by subtracting the common offset $P_{c\_offset}$ and the unique probe offset $P_{j\_offset}$ from the calculated blade tip displacements $d_j$ for each probe 3. Advantageously the zeroed blade tip displacements $\bar{d}_j$ have had the offset components removed without affecting the dynamic content of the data. The resulting zeroed blade tip displacements $\bar{d}_j$ derived from blade tip times of arrival at several of the probes 3 are illustrated in FIG. 6. As will be apparent, the common and probe-specific offsets have been removed from the data so that for each probe 3 the zeroed blade tip displacements $\bar{d}_j$ are centred on zero displacement; that is, the mean displacement is zero.

Advantageously the method of the present invention does not require manual or automatic identification and isolation of vibration events before the blade tip displacements $d_j$ are zeroed. This reduces the potential for missing events or mischaracterising them, and the detrimental effect of including part or all of a vibration event in the data averaging used in known methods. The method of the present invention is therefore more robust than the known methods. Another advantage of the method of the present invention is that the zeroed blade tip displacements $\bar{d}_j$ are calculated in fewer steps than in known methods because the vibration events are not first identified and isolated.

Optionally the method comprises a further step to analyse the zeroed blade tip displacements $\bar{d}_j$. Thus the amplitude and/or phase of the vibration can be determined from the zeroed blade tip displacements $\bar{d}_j$ using any analysis method known to the skilled man.

The method of the present invention can also be used to assess the quality of the data acquisition system. If the acquisition system is ideal, the probe offsets $P_{j\_offset}$ will remain constant at all rotational speeds. However, practical acquisition systems exhibit different probe offsets $P_{j\_offset}$ at different rotational speeds. An indication of the error introduced by these acquisition system differences with speed can be seen from the gradient of the curve 36 representing the probe offset $P_{j\_offset}$.

Figure 7:
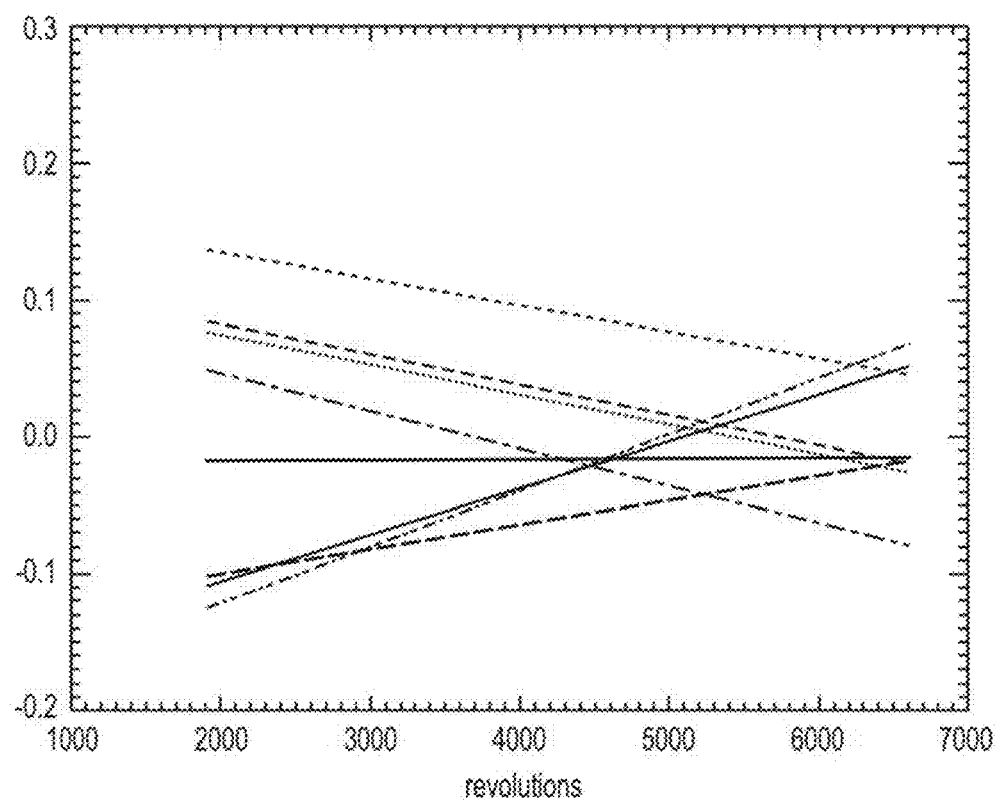
FIG. 7 is a graph showing $P_{j\_offset}$ for the exemplary data set.

FIG. 7 illustrates the curves 36 derived for probe offset $P_{j\_offset}$ for a set of eight probes 3 for the exemplary data set. It can be seen that some of the curves 36 have a positive linear correlation with rotational speed and others have a negative linear correlation. Thus some of the probes have an offset $P_{j\_offset}$ that is proportional to rotational speed whilst others have an offset $P_{j\_offset}$ that is inversely proportional to rotational speed. As discussed above, the correlation with rotational speed need not be linear but may be quadratic, polynomial, sinusoidal, logarithmic or described by any other suitable mathematical function.

The vertical intercept of each curve 36 is the offset due to the positional accuracy of the probe 3 relative to the expected position. Thus if one of the probes 3 is 0.2 mm further from top dead centre than expected, for example due to permitted manufacturing tolerance, the vertical intercept of the probe offset $P_{j\_offset}$ will be at ±0.2 mm (depending on whether it is further in the clockwise or anticlockwise direction and in which direction the position is measured).

The gradient of the probe offset $P_{j\_offset}$ represents the error due to the acquisition system. Such errors include, for example, shifts of the detection point on a blade tip which change the time taken to receive a reflection of the laser signal from the probe 3 and therefore the time of arrival measurement recorded. The detection point can shift due to centrifugal growth of the blade 4 and contamination of the blade tip changing the blade's apparent radial length. The acquisition errors also include shifts of the blade identification window. In order to record data about a given blade 4 at each of the j probes 3 a circumferential offset of the blade 4 from the once per revolution indication on the shaft, measured by the once per revolution probe 1, is required. However, the shaft and blade tips experience different rotational speeds, due to the radial spacing between them, and different loading so that the circumferential offset is not constant. This gradient information can therefore be used to compare different acquisition systems to determine which introduces fewest errors into the blade tip displacements $d_j$ measured.

A further optional use of the method of the present invention is to compare the dynamic content of the common term $P_{common}$ for two or more implementations. This will give an indication of the amount of casing vibration experienced by each of the implementations. Alternatively it may be used to compare the dynamic content of the common term $P_{common}$ for one implementation at two or more separate points in time. This will give an indication of the change in casing vibration over time. Thus this feature of the present invention may be used to add development work to reduce casing vibration or for monitoring deterioration in vibration over time.

The method of the present invention is preferably encompassed in computer-implemented code and stored on a computer-readable medium. It is thus a computer-implemented method of zeroing blade tip displacement data. The method may be implemented on a basic computer system comprising a processing unit, memory, user interface means such as a keyboard and/or mouse, and display means. The method may be performed 'offline' on blade tip timing data which has been measured and recorded previously. Alternatively it may be performed in 'real-time', that is at the same time that the blade tip times of arrival are measured by the probes 3. In this case the computer may be coupled to the rotor 2. Where the rotor 2 forms part of a gas turbine engine 10 the computer may be an electronic engine controller or another on-board processor. Where the gas turbine engine 10 powers an aircraft, the computer may be an engine controller, a processor on-board the engine 10 or a processor on-board the aircraft.

Preferably the method of the present invention is repeated for each blade 4 in the array of blades 4 that form the rotor 2. Preferably the method is performed in parallel for at least two of the blades 4 in the array. Where the processor on which the method is performed is a computer this is a simple matter. For example, the time of arrival measurements for each of the blades 4 forming the array of blades 4 at each of the probes 3 in the array of probes 3 can be recorded in a multi-dimensional matrix. The necessary data can then be extracted by the processor to perform the method for each blade 4.

Although the method steps have been described in a particular order, some of the steps may be performed in a different order.

The present invention also provides a blade tip displacement system comprising the rotor 2 having the array of blades 4 that rotate at a rotational speed. The system includes the array of probes 3 that may be equally or irregularly spaced circumferentially around part or the whole circumference of a rotor casing. The probes 3 are arranged to measure the arrival time of each blade tip for at least two consecutive revolutions of the rotor 2 and pass the measurements to a processor. The processor is configured to perform the method of the present invention.

The method of the present invention requires time of arrival data for at least two revolutions of the rotor 2. Preferably the revolutions are consecutive. However, in some embodiments or applications it may be beneficial to use non-consecutive revolutions, such as alternate revolutions. The method may use time of arrival data from more than two revolutions of the rotor 2. Advantageously this reduces the noise to signal ratio. However, it is necessary to ensure that the rotational speed of the rotor 2 does not change during the revolutions measured since the method averages the values of each of the common terms $P_{common}$ and the unique terms $P_{j\_unique}$ across the measured revolutions.

The method of the present invention is preferably applied to obtain zeroed blade tip displacements $\bar{d}_j$ for each successive revolution of the rotor 2. Thus where time of arrival data from two revolutions are used, data from the first and second revolutions are processed by the method to provide zeroed blade tip displacements $\bar{d}_j$ the first revolution. Then time of arrival data from the second and third revolutions are used to provide zeroed blade tip displacements $\bar{d}_j$ for the second revolution. As will be apparent, the time of arrival data from the second revolution is used in application of the method to provide the zeroed blade tip displacements $\bar{d}_j$ for both the first and second revolutions.

Advantageously the method can be used to zero blade tip displacement data in substantially real time; that is, as the time of arrival measurements are taken they can be processed to produce the zeroed blade tip displacements $\bar{d}_j$ as soon as at least two revolutions worth of measurements are available. Thus the method has particular utility in real time analysis applications such as engine health monitoring and control systems for a gas turbine engine 10.

Although the method of the present invention has been described in relation to a blade tip timing data, in other embodiments the time of arrival data can be measured from a feature on a rotor 2 without blades 4. For example, a pitch change mechanism may comprise a rotating cylinder which translates to effect pitch change. Such a pitch change mechanism may comprise optical recognisable features such as notches, grooves, protrusions or coloured lines on the cylinder at defined positions relative to a once per revolution feature. The method of the present invention can be applied to zero the displacement data derived from the time of arrival measurements obtained from such features.

The method of the present invention can be applied to blade tip timing measurements howsoever obtained. The measurements may be obtained in development or during operational running. Thus it has applications in any bladed rotor in a gas turbine engine for aerospace, marine or industrial use, such as fan blades, compressor stages and turbine stages. It also has potential application for wind and tidal turbines, turbochargers, motors and any other rotors that comprise either blades or features from which time of arrival measurements can be taken.

The invention claimed is:

1. A method of zeroing displacement data, the data being derived from a rotor having an array of features that rotate at a rotational speed, the features being monitored by an array of stationary timing probes, the method comprising:
    a) rotating the array of features of the rotor at the rotational speed and measuring an actual time of arrival of each feature at each probe for at least two revolutions of the rotor;
    b) subtract a predicted time of arrival of the feature at each probe to give a difference;
    c) multiply the difference by the rotational speed to calculate the displacement ($d_j$) at each probe for each measured revolution;
    d) define each displacement ($d_j$) as a sum of a common term ($P_{common}$) and a unique term ($P_{j\_unique}$), wherein the common term ($P_{common}$) is common to all the calculated displacements and the unique term ($P_{j\_unique}$) is dependent on the probe;
    e) solve the set of displacements ($d_j$) for the common term ($P_{common}$) and the unique terms ($P_{j\_unique}$);
    f) calculate a probe offset ($P_{j\_offset}$) from each unique term ($P_{j\_unique}$);
    g) determine the zeroed displacements by subtracting at least part of the common term ($P_{common}$) and probe offset ($P_{j\_offset}$) from the calculated displacements ($d_j$) for each probe; and
    h) identifying vibration events associated with a respective feature in the rotor based on the zeroed displacements.

2. A method as claimed in claim 1 wherein the method is repeated for each feature comprised in the array.

3. A method as claimed in claim 2, wherein the method is performed in parallel for at least two of the features comprised in the array.

4. A method as claimed in claim 1, comprising a step before step 1.g) to calculate a common offset ($P_{c\_offset}$) from the common term ($P_{common}$).

5. A method as claimed in claim 4, wherein step 1.g) comprises subtracting only the common offset ($P_{c\_offset}$) element of the common term ($P_{common}$).

6. A method as claimed in claim 4, wherein the step of calculating the common offset ($P_{c\_offset}$) comprises fitting a curve to the common term ($P_{common}$).

7. A method as claimed in claim 1, wherein step 1.f) comprises fitting a curve to each unique term ($P_{j\_unique}$).

8. A method as claimed in claim 1, comprising a further step between steps 1.d) and 1.e) to write the displacements ($d_j$) as a matrix and wherein step 1.e) comprises applying Gaussian elimination and back substitution.

9. A method as claimed in claim 1 comprising a further step between steps 1.d) and 1.e) to apply a filter to the unique terms ($P_{j\_unique}$).

10. A method as claimed in claim 9, wherein the filter comprises one of the group comprising: a low pass filter; a band pass filter; and a fixed length Savitsky Golay filter.

11. A method as claimed in claim 1, comprising a further step to determine vibration amplitude and phase from the zeroed displacements.

12. A method as claimed in claim 1, further comprising a step to calculate the gradient of each unique term ($P_{j\_unique}$) with respect to speed to determine measurement system quality.

13. A non-transitory computer readable medium, having a computer program recorded thereon, wherein the computer program is adapted to make the computer execute the method according to claim 1.

14. A displacement system comprising:
    a) a rotor having an array of features that rotate at a rotational speed;
    b) an array of stationary timing probes arranged to measure the time at which each feature passes the probe for each of at least two revolutions of the rotor; and
    c) a processor configured to perform the method as claimed in claim 1.

15. A displacement system as claimed in claim 14, wherein the probes are unequally circumferentially spaced.

16. A displacement system as claimed in claim 14, wherein each feature comprises a blade.

17. A gas turbine engine comprising the displacement system as claimed in claim 14.

18. A gas turbine engine as claimed in claim 17, wherein the rotor comprises one of the group comprising: a compressor rotor; a fan; and a turbine rotor.

* * * * *